June 24, 1924.
R. J. MORGAN ET AL
1,499,118
COOKING VESSEL
Filed July 11, 1921
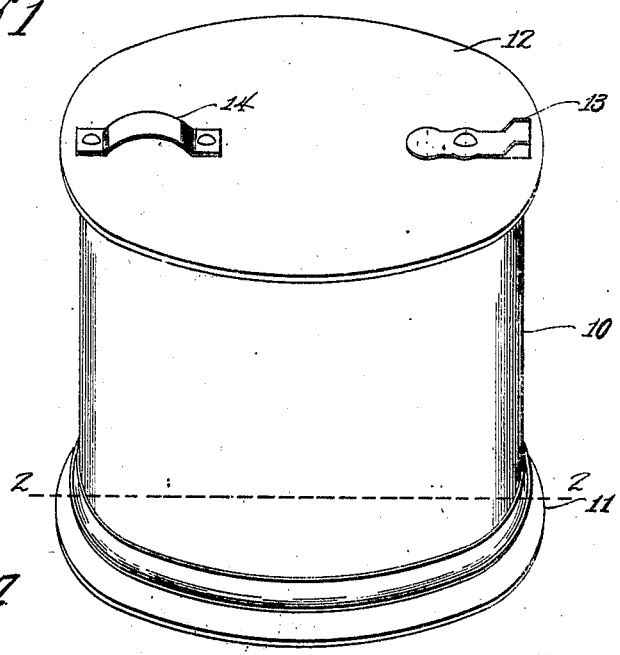
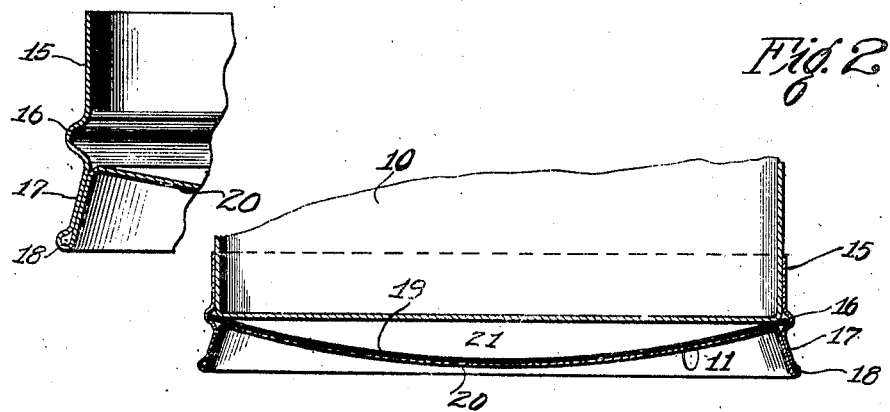
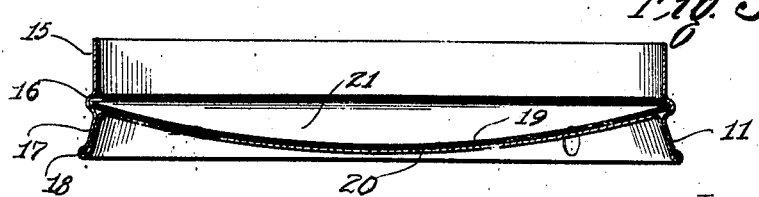
Witness
J. L. Brown.
Inventors
Ray J. Morgan & Robert H. Wentorf
By Sprinkler Hopkins & McNair
Attys.

Patented June 24, 1924.

1,499,118

UNITED STATES PATENT OFFICE.

RAY J. MORGAN, OF CHICAGO, ILLINOIS, AND ROBERT H. WENTORF, OF WEST BEND, WISCONSIN, ASSIGNORS TO WEST BEND ALUMINUM COMPANY, A CORPORATION OF WISCONSIN.

COOKING VESSEL.

Application filed July 11, 1921. Serial No. 483,898.

*To all whom it may concern:*

Be it known that we, RAY J. MORGAN and ROBERT H. WENTORF, both citizens of the United States, said MORGAN residing at Chicago, in the county of Cook and State of Illinois, and said WENTORF residing at West Bend, in the county of Washington and State of Wisconsin, have invented certain new and useful Improvements in Cooking Vessels, of which the following is a specification.

The invention relates to cooking vessels and is more particularly directed to that class of boilers which have steam tight covers, and has for its primary object the provision of a cooking vessel having a heat retaining compartment.

Another object of the invention is to provide a cooking vessel of such construction that the contents of the vessel will be kept at a high degree of heat for several hours after the vessel is removed from its source of heat.

A further object of the invention is to construct a supporting base for a cooking vessel made of a single piece of metal and so formed as to provide a heat compartment intermediate the base and bottom of the cooking vessel.

Other objects of the invention will appear from the following description which is directed to the preferred embodiment of the invention, reference being had to the accompanying drawing forming a part of the specification, in which Fig. 1 is a perspective view of the cooking vessel and its base in assembled relation.

Fig. 2 is a vertical sectional view taken on line 2—2 of Fig. 1 showing the heat retaining compartment intermediate the bottom of the vessel and the base.

Fig. 3 is a vertical section of the base.

Fig. 4 is an enlarged detail fragmental section of the base.

Like reference characters refer to like parts throughout the drawing.

Reference character 10 represents the vessel preferably of cylindrical form which is adapted to have a tight telescopic relation with base 11, having cover 12 thereon, which cover is provided with valve 13 to provide for the escape of steam from the interior of the vessel, a handle or grip 14 being provided for the removal of the cover 12 from the vessel 10. Base 11 is formed from a single piece of metal which has an upturned flange 15 for receiving in telescopic relation vessel 10, and has outwardly formed peripherally bead 16 intermediate the bottom or supporting portion 17 and the upturned flange 15, thus forming a support for the peripheral edge of a sheet of heat insulating material such as asbestos 19. Base 11 is formed with a concave bottom 20, thus providing a heat retaining chamber 21 intermediate the bottom of the base member and the bottom of the vessel 10. The heat is retained in this chamber by reason of the insulating or asbestos pad 19 contacting the concave bottom 20 of the base and confining the heated air between the bottom of the vessel and the asbestos pad. By this arrangement it will be readily understood that the contents of the vessel will be kept at a high degree of heat for a considerable length of time after the vessel has been removed from the source of heat, because the heat in this chamber can only diffuse through the bottom of the vessel as the asbestos pad prevents the diffusion of the heat through the base. It will be noted by reference to Fig. 4 that the metal forming the base is composed of a single piece, which is bent outwardly at the lower portion of the upturned flange 15, thus forming bead 16 and then inwardly and downwardly forming the supporting portion 17, thence outwardly and upwardly against itself forming bead 18 and reinforcing the supporting portion 17, and is then given a concave or dish-like shape forming the bottom 20.

It has been found that a cooking vessel formed in accordance with our invention providing a heat retaining chamber between the bottom of the vessel and the bottom of the base will retain the contents of the vessel at a high degree of heat for several hours after the removal of the vessel from the source of heat, which is due to the fact that the bottom portion of the vessel is adapted to have what is known as a push fit within the upturned flanges of the base, thereby trapping the heat within the heated air retaining chamber between the vessel and the base.

The provision of the heat retaining chamber between the base and the bottom of the vessel proper 10 provides a structure whereby the heat applied to the bottom of the base is indirectly applied to the contents of the vessel, thereby diminishing to the minimum the danger of scorching the contents of the vessel, while the asbestos plate intermediate the bottom of the vessel and the supporting base of the vessel aids in the indirect application of heat to the contents of the vessel.

In order that the invention might be understood the details of an embodiment of the invention have been shown, but it is not desired to be limited to the details as herein shown except as defined in the claims, since it will be apparent that persons skilled in the art may resort to various modifications without departing from the purpose and spirit of our invention.

Having thus described our invention, what we claim is:

1. A cooking vessel having a detachable base formed of a single piece of sheet metal, said base having a downwardly curved bottom, a bead formed intermediate the top and bottom of the base, and an insulating element supported by the bottom and the bead.

2. A cooking vessel having a detachable base formed of a single piece of sheet metal, said base having a downwardly curved bottom, a bead intermediate the top and bottom of the base having a recess formed on the inner side thereof, and an insulating element above the base and extending into the recesses.

3. The combination with a container of a removable base formed from a single piece of metal being so shaped as to form a concave bottom having a portion formed by bending the metal downwardly, then outwardly and upwardly upon itself to form a supporting portion for said base and terminating in an upstanding flange extending above the concave bottom portion for telescopically receiving and holding the container.

4. The combination with a container of a removable base formed from a single piece of metal being so shaped as to form a concave bottom having a supporting portion formed by bending the metal downwardly, then outwardly and upwardly upon itself to form a supporting portion for said base and terminating in an upstanding flange extending above the concave bottom portion for telescopically receiving and holding the container, and an outwardly extending bead formed intermediate the top and bottom of the base.

5. The combination with a container of a removable base formed from a single piece of metal being so shaped as to form a concave bottom having a supporting portion formed by bending the metal downwardly, then outwardly and upwardly upon itself so as to form a reinforcing leg, a peripherally formed bead positioned adjacent the concave bottom for supporting an asbestos pad, said pad extending into said peripherally formed bead, and a flange formed above said bead for telescopically receiving and holding the container.

Signed at Chicago, Illinois, this 5th day of July, 1921.

RAY J. MORGAN.

Signed at West Bend, Wisconsin, this 6th day of July, 1921.

ROBERT H. WENTORF.